United States Patent [19]

Inoue et al.

[11] Patent Number: 6,097,557

[45] Date of Patent: Aug. 1, 2000

[54] METHOD AND APPARATUS FOR RECORDING COMPRESSED AUDIO DATA ON RECORDING MEDIUM AND METHOD FOR TRANSFERRING COMPRESSED AUDIO DATA

[75] Inventors: Hiraku Inoue, Kanagawa; Toshihiko Takahashi, Chiba; Nobuyuki Kihara; Shoko Hiroyasu, both of Tokyo, all of Japan

[73] Assignee: Sony Corporation, Tokyo, Japan

[21] Appl. No.: 09/084,417

[22] Filed: May 27, 1998

[30] Foreign Application Priority Data

May 29, 1997 [JP] Japan ................................. 9-140595
Aug. 19, 1997 [JP] Japan ................................. 9-222723

[51] Int. Cl.⁷ .................................................. G11B 27/02
[52] U.S. Cl. ............................... 360/13; 360/18; 360/60; 360/49; 369/83
[58] Field of Search ................................. 360/18, 13, 15, 360/49, 60, 48, 72.2; 369/83, 32, 84

[56] References Cited

U.S. PATENT DOCUMENTS

| | | | |
|---|---|---|---|
| 3,913,135 | 10/1975 | Damlamian | 360/18 X |
| 5,299,069 | 3/1994 | Kohsaka et al. | 360/18 |
| 5,920,535 | 7/1999 | Hisamatsu | 360/13 X |
| 5,982,977 | 11/1999 | Naruse et al. | 360/15 X |

FOREIGN PATENT DOCUMENTS

| | | |
|---|---|---|
| 0612067 | 8/1994 | European Pat. Off. . |
| 0655740 | 5/1995 | European Pat. Off. . |
| 0896333 | 2/1999 | European Pat. Off. . |
| 0896334 | 2/1999 | European Pat. Off. . |
| 0898278 | 2/1999 | European Pat. Off. . |

OTHER PUBLICATIONS

The Rewritable MiniDisc System, Tadao Yoshida, Proceedings of the IEEE, vol. 82, No. 10, Oct. 1, 1994, pp. 1492–1500.

*Primary Examiner*—Alan T. Faber
*Attorney, Agent, or Firm*—Jay H. Maioli

[57] ABSTRACT

A transfer protocol in a transfer system adapted for transferring compressed audio signals in a compressed form for recording on a recording medium is disclosed. The management data for managing compressed audio signals recorded on the recording medium are generated responsive to the information sent from the server in order to generate the management data without exchanging the management data between the server and the client. A transfer system in which, if data are previously recorded on the recording medium loaded on the client side, the management data can be edited for additionally recording data on the recording medium without modifying the compressed audio data and management data already recorded on the recording medium, is also disclosed.

21 Claims, 17 Drawing Sheets

|   | 16BITS | | 16BITS | |
|---|---|---|---|---|
|   | MSB         LSB | MSB         LSB | MSB         LSB | MSB         LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | MAKER CODE | MODEL CODE | FIRST TNO | LAST TNO |
| 8 | 00000000 | 00000000 | 00000000 | USED SECTORS |
| 9 | 00000000 | 00000000 | 00000000 | 00000000 |
| 10 | 00000000 | 00000000 | 00000000 | DISC SERIAL NO |
| 11 | DISC | ID | P-DFA | P-EMPTY |
| 12 | P-FRA | P-TNO1 | P-TNO2 | P-TNO3 |
| 13 | P-TNO4 | P-TNO5 | P-TNO6 | P-TNO7 |
| 74 | P-TNO248 | P-TNO249 | P-TNO250 | P-TNO251 |
| 75 | P-TNO252 | P-TNO253 | P-TNO254 | P-TNO255 |
| 76 | 00000000 | 00000000 | 00000000 | 00000000 |
| 77 | 00000000 | 00000000 | 00000000 | 00000000 |
| 78 | START ADDRES | | | TRACK MODE |
| 79 | END ADDRESS | | | LINK INFORMATION |
| 80 | START ADDRES | | | TRACK MODE |
| 81 | END ADDRESS | | | LINK INFORMATION |
| 82 | START ADDRES | | | TRACK MODE |
| 83 | END ADDRESS | | | LINK INFORMATION |
| 580 | START ADDRES | | | TRACK MODE |
| 581 | END ADDRESS | | | LINK INFORMATION |
| 582 | START ADDRES | | | TRACK MODE |
| 583 | END ADDRESS | | | LINK INFORMATION |
| 584 | START ADDRES | | | TRACK MODE |
| 585 | END ADDRESS | | | LINK INFORMATION |
| 586 | START ADDRES | | | TRACK MODE |
| 587 | END ADDRESS | | | LINK INFORMATION |

FIG.4

|   | 16BITS | | 16BITS | |
|---|---|---|---|---|
|   | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000010 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME/TRACK NAME | | | |
| 79 | DISC NAME/TRACK NAME | | LINK INFORMATION | |
| 80 | DISC NAME/TRACK NAME | | | |
| 81 | DISC NAME/TRACK NAME | | LINK INFORMATION | |
| 82 | DISC NAME/TRACK NAME | | | |
| 83 | DISC NAME/TRACK NAME | | LINK INFORMATION | |
| 584 | DISC NAME/TRACK NAME | | | |
| 585 | DISC NAME/TRACK NAME | | LINK INFORMATION | |
| 586 | DISC NAME/TRACK NAME | | | |
| 587 | DISC NAME/TRACK NAME | | LINK INFORMATION | |

FIG.8

|   | 16BITS | | 16BITS | |
|---|---|---|---|---|
|   | MSB          LSB | MSB          LSB | MSB          LSB | MSB          LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TRD1 | P-TRD2 | P-TRD3 |
| 13 | P-TRD4 | P-TRD5 | P-TRD6 | P-TRD7 |
| 14 | P-TRD8 | P-TRD9 | P-TRD10 | P-TRD11 |
| 15 | P-TRD12 | P-TRD13 | P-TRD14 | P-TRD15 |
| 16 | P-TRD16 | | | |
| 17 | | | | |
| 73 | | | | |
| 74 | P-TRD248 | P-TRD249 | P-TRD250 | P-TRD251 |
| 75 | P-TRD252 | P-TRD253 | P-TRD254 | P-TRD255 |
| 76 | RECORDING DATE AND TIME | | | |
| 77 | | | MAKER CODE | MODEL CODE |
| 78 | RECORDING DATE AND TIME | | | |
| 79 | | | MAKER CODE | MODEL CODE |
| 80 | RECORDING DATE AND TIME | | | |
| 81 | | | MAKER CODE | MODEL CODE |
| 82 | RECORDING DATE AND TIME | | | |
| 83 | | | MAKER CODE | MODEL CODE |
| 84 | RECORDING DATE AND TIME | | | |
| 85 | | | | LINK INFORMATION |
| 86 | | | | |
| 586 | RECORDING DATE AND TIME | | | |
| 587 | | | | LINK INFORMATION |

FIG.9

|   | 16BITS | | 16BITS | |
|---|---|---|---|---|
|   | MSB      LSB | MSB      LSB | MSB      LSB | MSB      LSB |
| 0 | 00000000 | 11111111 | 11111111 | 11111111 |
| 1 | 11111111 | 11111111 | 11111111 | 11111111 |
| 2 | 11111111 | 11111111 | 11111111 | 00000000 |
| 3 | CLUSTER H | CLUSTER L | 00000000 | 00000000 |
| 4 | 00000000 | 00000000 | 00000000 | 00000000 |
| 5 | 00000000 | 00000000 | 00000000 | 00000000 |
| 6 | 00000000 | 00000000 | 00000000 | 00000000 |
| 7 | 00000000 | 00000000 | 00000000 | 00000000 |
| 8 | 00000000 | 00000000 | 00000000 | 00000000 |
| 9 | 00000000 | 00000000 | 00000000 | 00000000 |
| 10 | 00000000 | 00000000 | 00000000 | 00000000 |
| 11 | 00000000 | 00000000 | 00000000 | P-EMPTY |
| 12 | 00000000 | P-TNA1 | P-TNA2 | P-TNA3 |
| 13 | P-TNA4 | P-TNA5 | P-TNA6 | P-TNA7 |
| 14 | P-TNA8 | P-TNA9 | P-TNA10 | P-TNA11 |
| 15 | P-TNA12 | P-TNA13 | P-TNA14 | P-TNA15 |
| 16 | P-TNA16 | | | |
| 17 | | | | |
| 73 | | | | |
| 74 | P-TNA248 | P-TNA249 | P-TNA250 | P-TNA251 |
| 75 | P-TNA252 | P-TNA253 | P-TNA254 | P-TNA255 |
| 76 | DISC NAME | | | |
| 77 | DISC NAME | | LINK INFORMATION | |
| 78 | DISC NAME OR TRACK NAME | | | |
| 79 | DISC NAME OR TRACK NAME | | LINK INFORMATION | |
| 80 | DISC NAME OR TRACK NAME | | | |
| 81 | DISC NAME OR TRACK NAME | | LINK INFORMATION | |
| 82 | DISC NAME OR TRACK NAME | | | |
| 83 | DISC NAME OR TRACK NAME | | LINK INFORMATION | |
| 84 | DISC NAME OR TRACK NAME | | | |
| 85 | DISC NAME OR TRACK NAME | | LINK INFORMATION | |
| 86 | DISC NAME OR TRACK NAME | | | |
| 586 | DISC NAME OR TRACK NAME | | | |
| 587 | DISC NAME OR TRACK NAME | | LINK INFORMATION | |

FIG.10

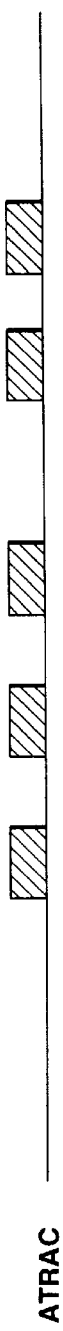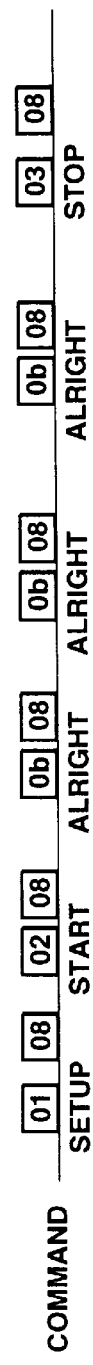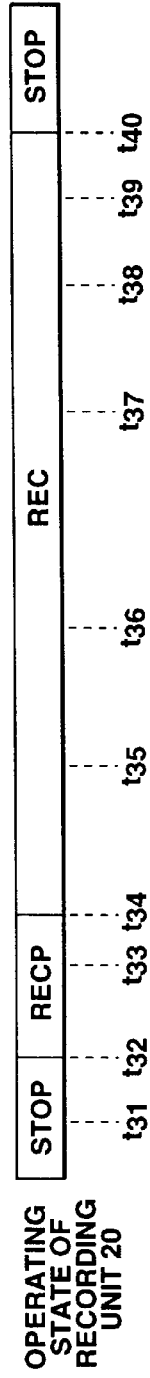

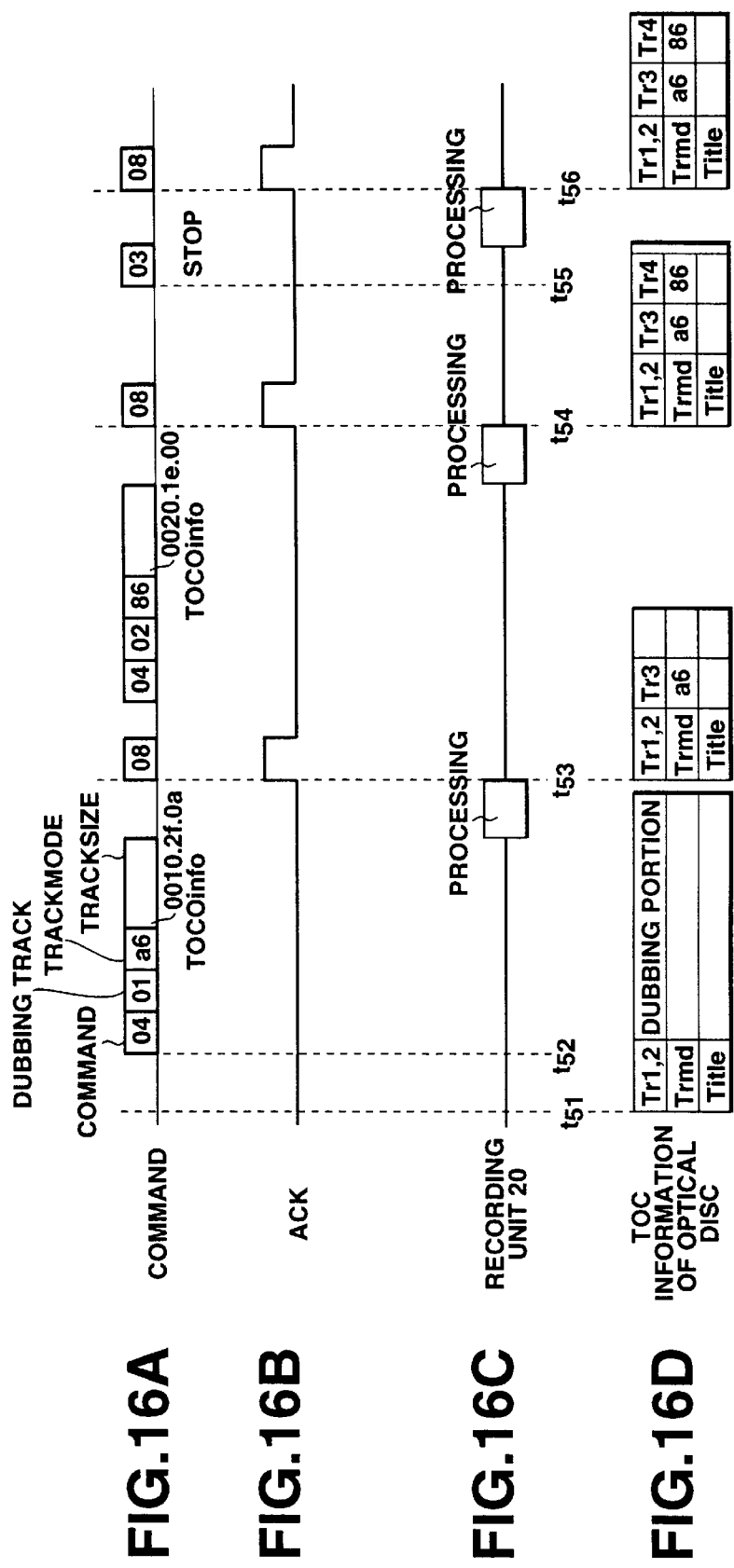

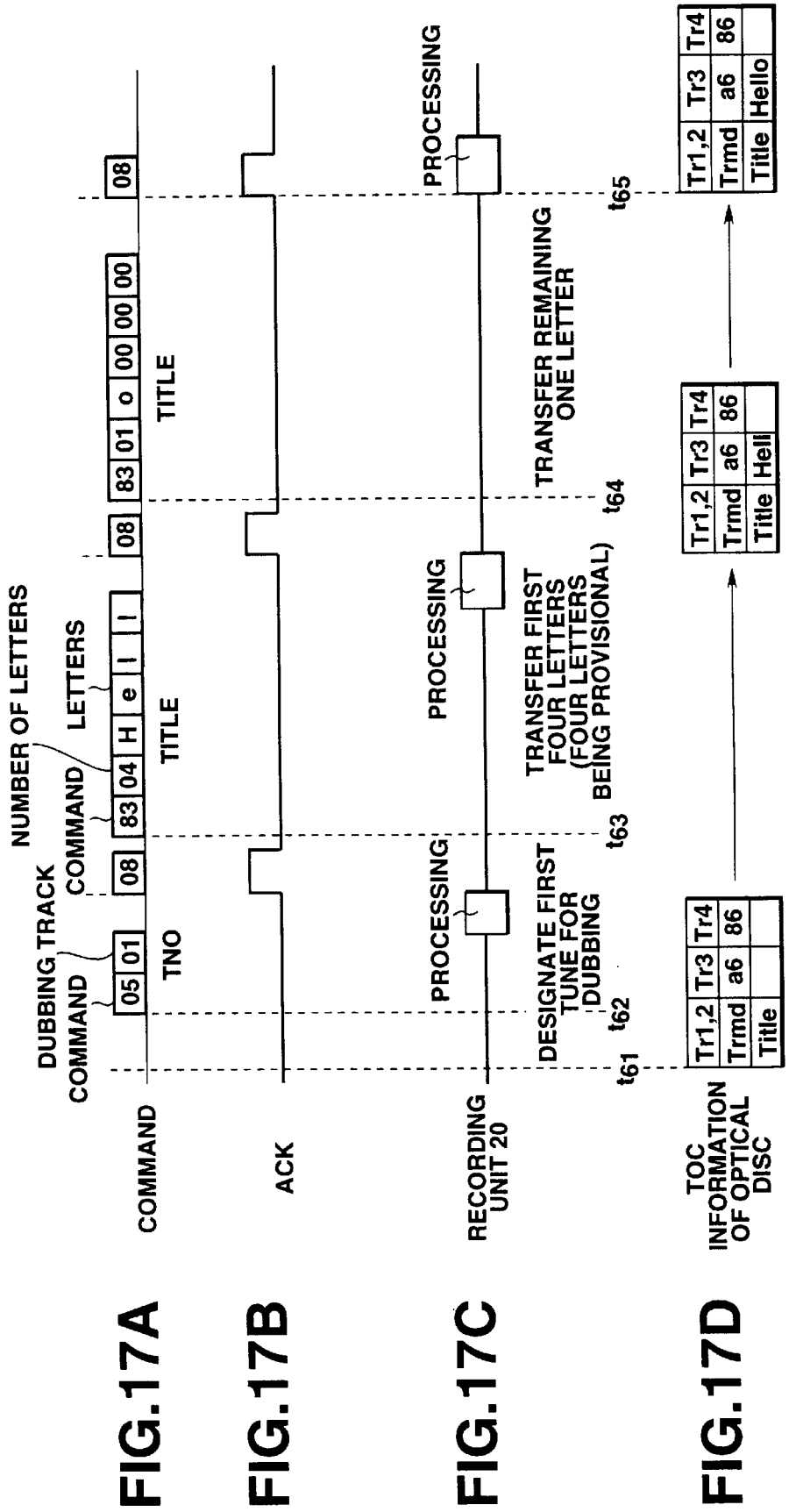

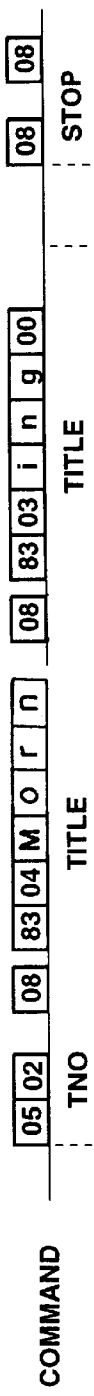
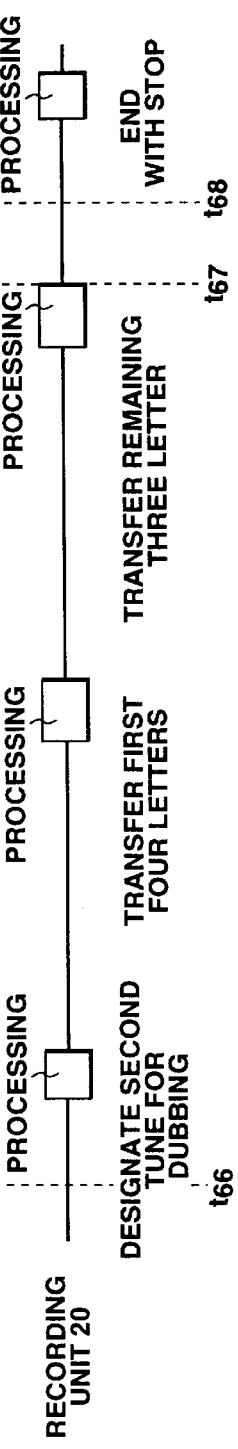
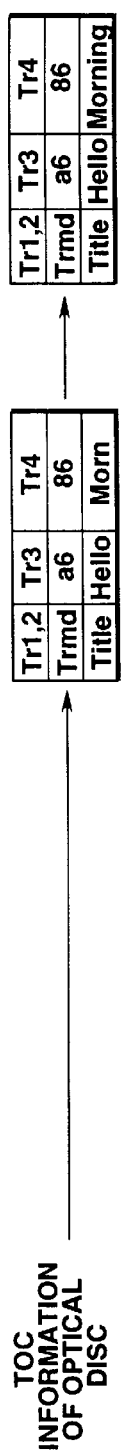

| TNO | TITLE | TRMD | TRACKSIZE |
|-----|---------|------|------------|
| Tr1 | EMOTION | e6 | 0011.05.02 |
| Tr2 | DREAM | e6 | 0022.1f.0a |
| Tr3 | HELLO | a6 | 0010.2f.0a |
| Tr4 | MORNING | 86 | 0020.1e.00 |

FIG.19

METHOD AND APPARATUS FOR RECORDING COMPRESSED AUDIO DATA ON RECORDING MEDIUM AND METHOD FOR TRANSFERRING COMPRESSED AUDIO DATA

BACKGROUND OF THE INVENTION

Field of the Invention

This invention relates to a method and apparatus for recording compressed audio data on recording medium and a method for transferring compressed audio data. More particularly, it relates to a method and apparatus for recording audio data on recording medium and a method for transferring audio data, in which the recorded data can be random-accessed using the TOC information.

There has so far been known a magneto-optical disc, termed a mini-disc (trademark) which is a recordable and reproducible disc-shaped recording medium of approximately 64 mm in diameter housed within a cartridge. This magneto-optical disc can record stereo audio signals continuing for about 74 minutes in accordance with the Adaptive Transform Acoustic Coding (ATRAC) system. This magneto-optical disc can duplicate audio data because it can record the information in distinction from the conventional digital audio disc known as a compact disc (trademark).

Similarly to the conventional digital audio disc, the magneto-optical disc permits random accessing to the audio data recorded thereon, because an area for table-of-contents information (TOC information) for supervising the recorded audio data is provided in this magneto-optical disc in addition to an area for recording audio data. Therefore, if audio data is overwritten on the magneto-optical disc carrying recorded audio data, it is possible to erase or edit musical numbers without rewriting actual audio data.

There may be envisaged an audio dubbing system in which, for recording audio data compressed to approximately ⅕ on a magneto-optical disc, compressed audio data are directly stored in a server and read out therefrom so as to be recorded without processing the compressed data with decoding or encoding. In case of the audio dubbing system, compressed data can be recorded indifferently on a so-called virgin disc, that is an initialize disc. This, however, is not the case if compressed audio data is to be recorded on a magneto-optical disc on which plural musical numbers of compressed audio data are previously recorded, because the magneto-optical disc is owned by the user and the previously recorded data cannot be erased by overwriting. Therefore, if new compressed audio data is to be recorded on a magneto-optical disc carrying several previously recorded musical numbers, it is necessary to record audio data in vacant recordable areas of the magneto-optical disc, without erasing the previously recorded audio data, while it is also necessary to write the above-mentioned TOC information.

Since the TOC information is the information proper to the disc, it may be contemplated with the above-described audio dubbing system to transfer the TOC information from a recording device to a server as the source for dubbing, and to edit the TOC information in the server which then transfers the processed information back to the recording device. In this case, it is necessary for the server and the recording device to frequently exchange data other than the audio data, thus obstructing efficient recording of audio data.

SUMMARY OF THE INVENTION

It is an object of the present invention to provide a recording method and apparatus and a transferring method for audio data whereby, in recording compressed audio data on a magneto-optical disc, the TOC information is generated efficiently for recording the audio data on the magneto-optical disc.

It is another object of the present invention to provide a recording method and apparatus and a transferring method for audio data in which, as a configuration for purveying contents, such as audio, employing the magneto-optical disc, plural audio data, such as plural musical numbers, are previously stored in a server and only audio data of the contents desired by the user are read out from the server for recording on a magneto-optical disc owned by the user.

In one aspect, the present invention provides a recording apparatus for recording at least a compressed audio program on a recording medium having a management area and a recordable area, including receiving means for receiving the compressed audio program and a data capacity corresponding to the compressed audio program via a transfer path, recording means for recording the compressed audio program from the receiving means in the recordable area of the recording medium and generating means for generating the management information including start and end addresses of the compressed audio program in accordance with the data capacity size, wherein the recording means records the management information including the start and end addresses of the compressed audio program in the management area of the recording medium.

In another aspect, the present invention provides a transfer/reception system for transferring at least one compressed audio program and receiving the transferred compressed audio program, wherein the transfer means including generating means for generating the capacity size corresponding to the compressed audio program, transferring means for transferring the compressed audio program and the capacity size corresponding to the compressed audio program, and the receiving system includes receiving means for receiving the compressed audio program and capacity size corresponding to the compressed audio program, generating means for generating the management information in accordance with the capacity size corresponding to the compressed audio program, recording means for recording the compressed audio program and the management information in the recordable area and in the management area of the recording medium, respectively, whereby the transferred compressed audio program is divided into plural compressed audio programs in accordance with the capacity size.

In yet another aspect, the present invention provides a transferring/receiving method for transferring at least one compressed audio program and receiving the transferred compressed audio program, including the steps of generating the capacity size corresponding to the compressed audio program, transferring the compressed audio program and the capacity size corresponding to the compressed audio program, receiving the transferred compressed audio program and the capacity size corresponding to the compressed audio program, generating the management information in accordance with the capacity size corresponding to the compressed audio program and recording the compressed audio program and the management information in the recordable area and in the management area of the recording medium, respectively, whereby the transferred audio program is divided into plural compressed audio programs in accordance with the capacity size.

In the audio data recording method according to the present invention, the data size of each compressed audio data is transferred along with the compressed audio data and, based on the data size of each transferred audio data, recording start and recording end addresses of each recorded audio data divided from the data stream recorded on the recording medium are recorded in the management area of the recording medium. Thus, with the audio data recording method according to the present invention, the user-selected audio data can be efficiently recorded on the recording medium. The audio data are recorded in accordance with the transmitted data stream on the recording medium and the recording start and recording end addresses of each recorded audio data are also recorded in a form divided from the data stream on the recording medium for improving the utilization efficiency of the recording medium.

In the audio data recording apparatus according to the present invention, the data size of each audio data is transferred along with the compressed audio data, and the recording unit records recording start and end addresses of each recorded audio data, divided from the data stream recorded on the recording medium, in the management area of the recording medium. Thus, with the audio data recording method according to the present invention, the user-selected audio data can be efficiently recorded on the recording medium. The audio data are recorded in accordance with the transmitted data stream on the recording medium and the recording start and recording end addresses of each recorded audio data are also recorded in a form divided from the data stream on the recording medium for improving the utilization efficiency of the recording medium.

With the audio data transfer method according to the present invention, the data size of each compressed audio data is transmitted along with at least one selected audio data, thus enabling the transferred audio data to be recorded efficiently on the recording medium.

BRIEF DESCRIPTION OF THE DRAWINGS

FIG. 4 shows the data structure for a U-TOC sector 0 which is a management area on a magneto-optical disc embodying the present invention.

FIG. 8 shows a data structure for a U-TOC sector 1 which is a management area on a magneto-optical disc embodying the present invention.

FIG. 9 shows a data structure for a U-TOC sector 2 which is a management area on a magneto-optical disc embodying the present invention.

FIG. 10 shows a data structure for a U-TOC sector 4 which is a management area on a magneto-optical disc embodying the present invention.

FIG. 15A is a timing chart for compressed audio data ATRAC sent from the audio transferring unit 10 to the recording unit 20.

FIG. 15B is a timing chart of a request signal DATA Req sent from the recording unit 20 to the audio transferring unit 10.

FIG. 15C is a timing chart for illustrating a command signal Command sent from the audio transferring unit 10 to the recording unit 20.

FIG. 15D is a timing chart for illustrating an acknowledgment signal ACK sent from the recording unit 20 to the audio transferring unit 10.

FIG. 15E is a timing chart for illustrating the timing of processing on the recording unit.

FIG. 16A is a timing chart for illustrating a command signal Command sent from the audio transferring unit 10 to the recording unit 20.

FIG. 16B is a timing chart for illustrating an acknowledgment signal ACK sent from the recording unit 20 to the audio transferring unit 10.

FIG. 16C is a timing chart for illustrating the timing of processing on the recording unit.

FIG. 16D is a diagrammatic view showing the contents of the management information TOC formed on the optical disc D.

FIG. 17A is a timing chart for illustrating a command signal Command sent from the audio transferring unit 10 to the recording unit 20.

FIG. 17B is a timing chart for illustrating an acknowledgment signal ACK sent from the recording unit 20 to the audio transferring unit 10.

FIG. 17C is a timing chart for illustrating the timing of processing on the recording unit.

FIG. 17D is a diagrammatic view showing the contents of the management information TOC formed on the optical disc D.

FIG. 18A is a timing chart for illustrating a command signal Command sent from the audio transferring unit 10 to the recording unit 20.

FIG. 18B is a timing chart for illustrating an acknowledgment signal ACK sent from the recording unit 20 to the audio transferring unit 10.

FIG. 18C is a timing chart for illustrating the timing of processing on the recording unit.

FIG. 18D is a diagrammatic view showing the contents of the management information TOC formed on the optical disc D.

FIG. 19 illustrates the contents recorded on the optical disc D.

DESCRIPTION OF PREFERRED EMBODIMENTS

Figure 1:
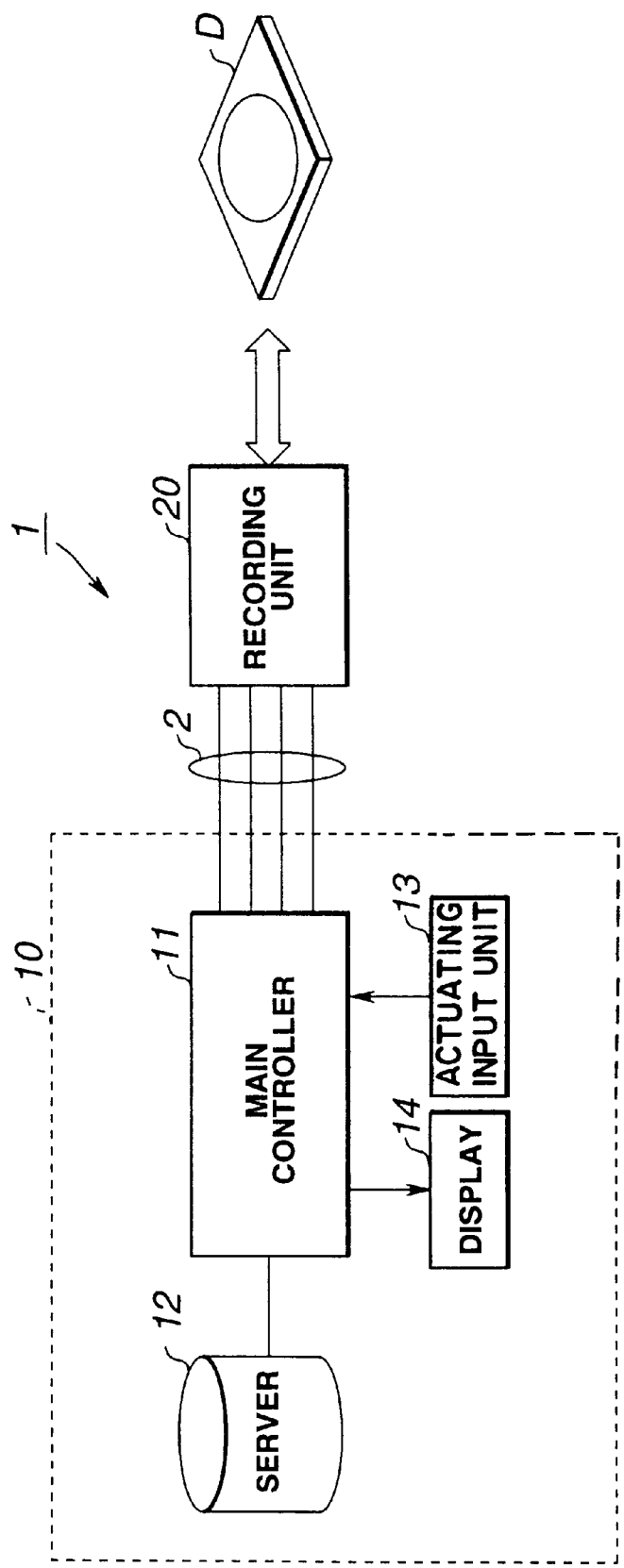
FIG. 1 is a block diagram of the overall dubbing system embodying the present invention.
Figure 2:
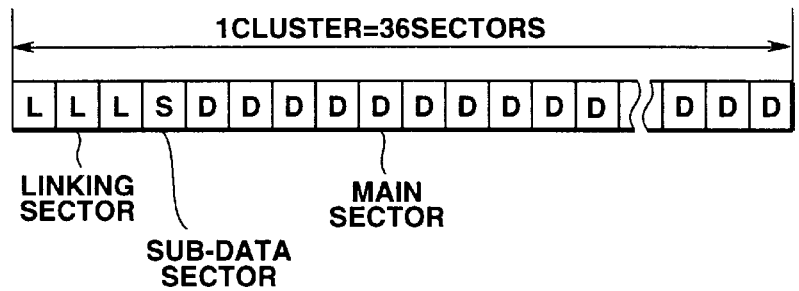
FIG. 2 shows the data structure on a magneto-optical disc embodying the present invention.

Referring to the drawings, preferred embodiments of an audio dubbing system according to the present invention will be explained in detail.

FIG. 1 shows an audio dubbing system embodying the present invention. An audio dubbing system 1 has an audio transfer unit 10 including a main controller 11, a server 12, an actuating input unit 13 and a display unit 14, a recording unit 20 for recording audio data on a portable recording medium and a connection cable 2 for interconnecting the audio transfer unit 10 and the recording unit 20.

In this audio dubbing system 1, audio data is previously stored in a server 12 of the audio transfer unit 10, so that the user will select desired audio data from the audio data stored in the server 12 for recording on a recording medium.

That is, the present audio dubbing system 1 is such a system purveying musical contents to the user by recording audio data on a recording medium owned by the user, instead of purveying contents of audio data stored in a medium such as compact disc or audio tape. For example, this audio dubbing system 1 can be installed on a railroad station or a retail store to furnish the chargeable musical contents to the user or on a music studio for contents management purposes.

The schematics of the contents purveying system of the present audio dubbing system 1 are hereinafter explained.

In the server 12 of the audio dubbing system 1, musical contents of musical numbers, each continuing for several minutes, such as top 100 numbers of the latest hit chart, are stored as audio data. The user confirms the contents purveyed by the audio dubbing system 1 by a display 14 and, if he or she finds desired contents, he or she selects one or plural contents using the actuating input unit 13. The user loads the recording medium D on the recording unit 20 and actuates the actuating input unit 13 to initiate the recording.

If the user initiates the recording operation, the main controller 11 of the audio transfer unit 10 furnishes audio data of the contents designated by the user, from among the contents stored in the server 12, to the recording unit 20. The recording unit 20 records the audio data furnished from the audio transfer unit 10 in a recordable area of the recording medium.

When the recording of audio data of the contents desired by the user comes to a close, the audio dubbing system 1 terminates the purveying of the contents.

Although the server 12 is included in the audio transfer unit 10 in FIG. 1, the server 12 can be installed in an information center located on a distant place and can be communicated with a unit which includes the main controller 11, the display unit 14, the actuating input unit 13, and the recording unit 20 using ISDN and phone line.

In the following description of the present audio dubbing system 1, it is assumed that the recording medium handled by the audio dubbing system 1 of the present embodiment is a magneto-optical disc which is a recordable and reproducible disc provided in the format termed a mini-disc (trademark).

This magneto-optical disc, termed the mini-disc, is a disc-shaped recording medium approximately 64 mm in diameter, held in a cartridge, and can record approximately 74 minutes of stereo audio data using a Adaptive Transform Acoustic Coding (ATRAC) system. This magneto-optical disc, termed the so-called mini-disc, is herein referred to simply as an optical disc D.

Since the audio dubbing system 1 records the audio data compressed in accordance with the ATRAC system on the optical disc D, audio data of the contents stored in the server 12 are previously compressed in accordance with the ATRAC system. The audio data, compressed in accordance with the ATRAC system, is directly recorded on the optical disc D, without processing the audio data with decoding or encoding. The audio data compressed by the ATRAC system is referred to herein as ATRAC data. Thus, a connection cable 2 used for transferring audio data from the audio transfer unit 10 to the recording unit 20 transfers the ATRAC data. It is noted that control commands or command data (Command) such as table-of-contents (TOC) data of the optical disc D are sent over the connection cable 2 in accordance with the transmission protocol which will be explained subsequently.

The format of data of the optical disc D used in the audio dubbing system 1 will now be explained.

Data can be written on the optical disc D in units corresponding to an integer number times of a cluster, as shown in FIG. 1. It is noted that an audio signal of approximately 2.04 second is produced on reproducing the ATRAC data recorded in each cluster.

It is noted that each cluster is made up of 3 linking sectors, 1 sub-data sector and 32 main sectors for recording audio data compressed in accordance with the ATRAC system, the sum of which is 36 sectors. Each sector is a unit made up of 2352 byte data.

Since the format of the optical disc D uses an error correction system of the Advanced Cross Interleaving Reed Solomon Code (ACIRC) system, the linking sector is used as a sector allocated for completing the error-correcting interleaving within the cluster. That is, the linking sector is a waste sector for taking into account the interleaving in the error correction so that the data rewriting will be made on the cluster basis.

The sub-data sector is a reserve area.

The optical disc D handles 424 byte data compressed in accordance with the ATRAC system in units termed a sound group. This sound group allocates 212 byte data for each of the left and right channels. This sound group allocates 212 byte data for each of the left and right channels. On expansion, the sound-group-based compressed data corresponds to 512 samples of left and right channels. These 512 samples of data correspond to 2048 byte data, more specifically, 512 samples×16 bits×2 channels÷8 bits=2048 bytes.

Figure 3:
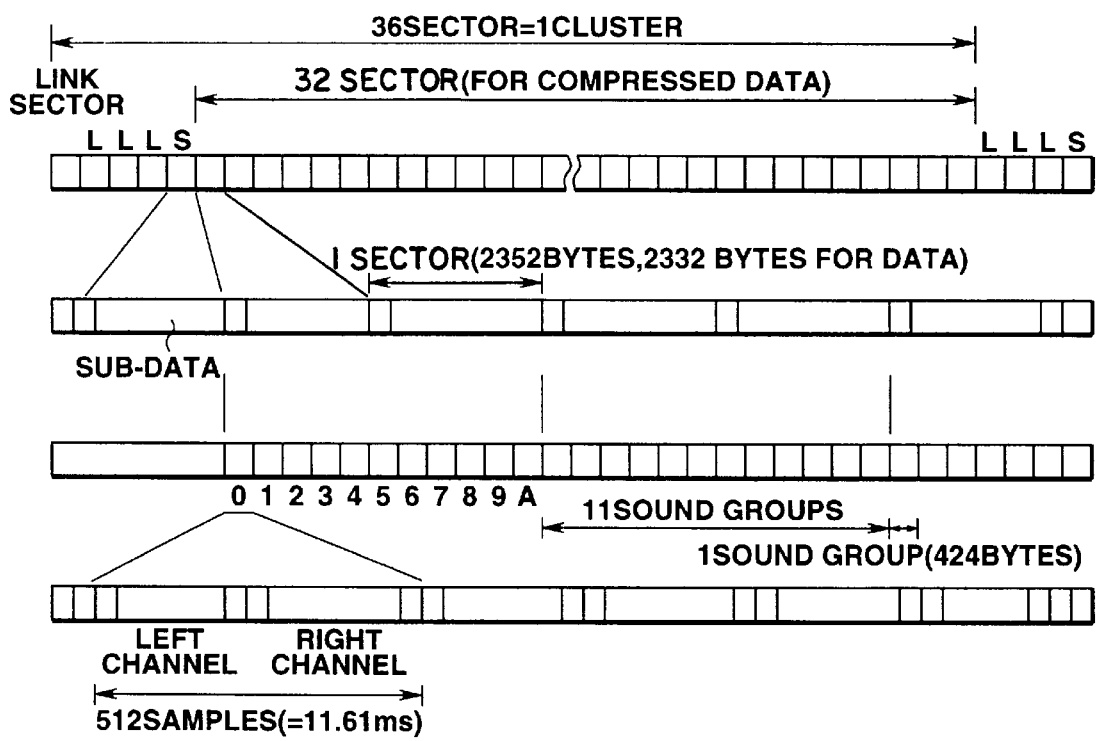
FIG. 3 similarly shows the data structure on a magneto-optical disc embodying the present invention.

11 of the sound groups make up two sectors, as shown in FIG. 3.

The recording area of the optical disc D is split into a program area for recording audio data compressed in accordance with the ATRAC system, a User Table-Of-Contents (U-TOC) area as a management area for recording management data for managing audio data recorded in the program area, and a Pre-mastered Table-Of-Contents (P-TOC) area as a lead-in area.

In this optical disc D, musical numbers can be erased or edited by rewriting the U-TOC information instead of physically erasing the actual music data for rewriting. For example, in the case of the optical disc D having recorded thereon five musical numbers, if a start address and an end address of a third musical number are specified as a recordable area, the third musical number cannot be reproduced. Thus, when recording the ATRAC data on the optical disc D, this U-TOC information needs to be re-written simultaneously. This U-TOC is explained hereinbelow. The unit of audio data recorded on the optical disc D is simply termed 'track'. This track is the unit of a musical number corresponding to the contents of the music purveyed by the above-described audio dubbing system 1.

The U-TOC of the optical disc D is made up of from U-TOC sector 0 to U-TOC sector 15, totaling 16 sectors. The U-TOC sector n, where n denotes 1 to 15, is indicated simply as U-TOCn.

FIG. 4 shows data recorded on the U-TOC0. the data recorded on the U-TOC0 is partitioned into bytes and represented as a slot for convenience. Each slot is specified by numerical figures from 0 to 587 on the ordinate in FIG. 4 by slot number of from 1 to 4 on the abscissa. The same applies for the U-TOC1 and so forth.

In the U-TOC0, there are recorded 12 byte header data followed by ClusterH and ClusterL specifying the address of the TOC0. In the TOC0, there are recorded a Maker code, specifying the maker of the optical disc D, a Model code, specifying the model of the optical disc D, FirstTNO specifying the track number of the first track of the optical disc D and LastTNO specifying the track number of the last track, beginning from a slot 7×1. In the U-TOC0, Used Sectors specifying the use state of the sectors and DiscSerialNo specifying the serial number of the optical disc D are recorded in slot 8×4 and in slot 10×4, respectively.

In the U-TOC0, there are also recorded DiscID specifying the ID number of the optical disc D, a pointer P-DFA (Pointer for Defective Area) specifying the slot having recorded therein the start address of an area for recording the defective address information produced on the optical disc D, a pointer P-EMPTY (Pointer for Empty Slot) specifying the use state of a slot and a pointer P-FRA (Pointer for Freely Area) specifying a slot having recorded therein the start address of an area used for managing the recordable area, beginning from a slot 11×1. In the U-TOC0, there is also recorded a pointer P-TNOn specifying the slot having recorded therein a start address of each track recorded on the optical disc D from a slot 12×2 to a slot 75×4, n specifying the track number of each track. Since 255 tracks can be provided on the optical disc D, n is an integer from 1 to 255.

In the U-TOC0, there are also recorded a start address and an end address of each track, link information Link-P and a track mode (Trackmode) from a slot 78×1 to a slot 587×4. In the U-TOC0, there are further recorded 255×4 slots for recording the start address and the end address. The start and end addresses are recorded in a slot associated with each track.

Therefore, the pointer recorded in each of the above-mentioned P-DFA, P-EMPTY and in P-FRA indicate a slot of a start address represented from the slot 78×1.

Figure 5:
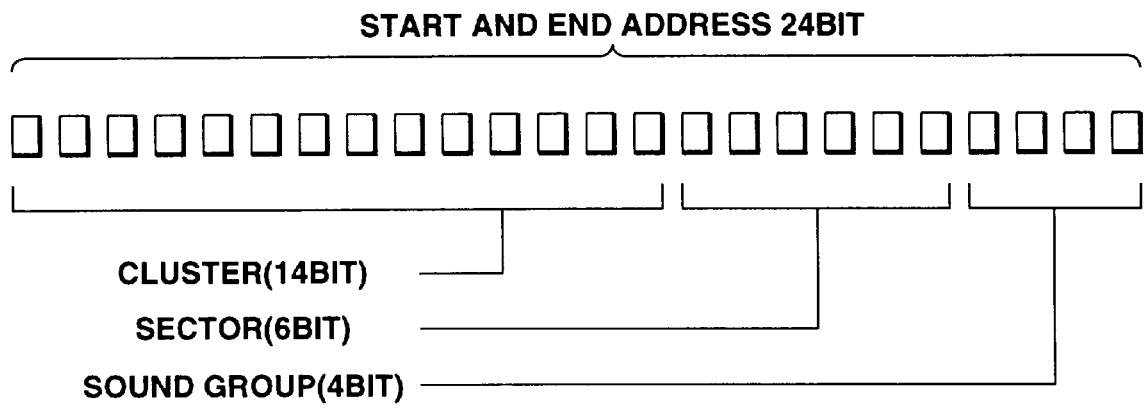
FIG. 5 shows the data structure of a slot on a U-TOC which is a management area on a magneto-optical disc embodying the present invention.

The above-mentioned start and end addresses are represented in 3 bytes=24 bits, as shown in FIG. 5. In the start and end addresses, a cluster address, a sector address and an address of the sound group are recorded in the first 14 bits, next 6 bits and the trailing 4 bits, respectively.

Figure 6:
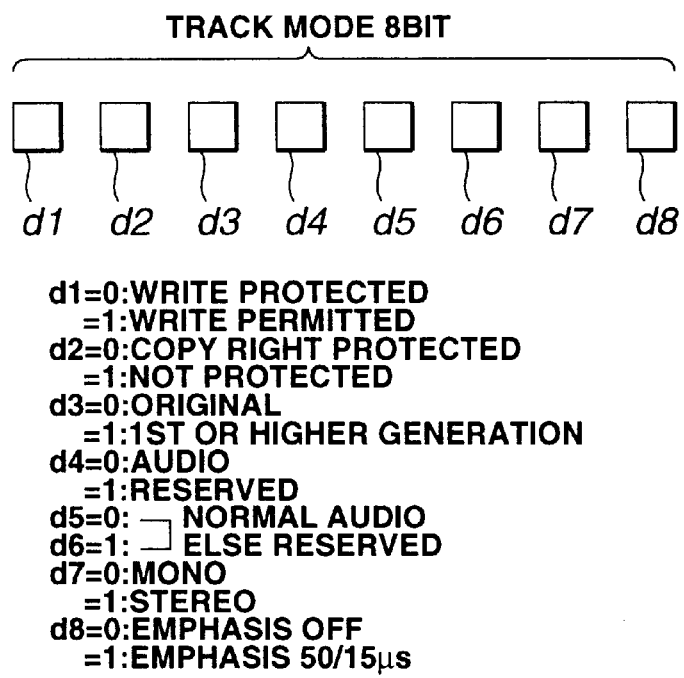
FIG. 6 shows the data structure of a track mode on a U-TOC which is a management area on a magneto-optical disc embodying the present invention.

The track mode (Trackmode) is represented by 1 byte=8 bit data, as shown in FIG. 6. In the track mode (Trackmode), the recording protect information, duplication protect information, generation information, audio information, erasure reserve information, monaural or stereo information and the emphasis information are recorded in the first bit, second bit, thirds bit, fourth bit, fifth and sixth bits, seventh bit and in the eighth bit, respectively. That is, the relevant information proper to each track is recorded in the track mode (Trackmode).

The link information P-Link is a pointer used for tracing from which start address the next data is recorded in case the same track is not recorded as a continuous data stream on the optical disc D, that is in case data of the same track is recorded discretely in the recording area of the optical disc. For example, if, in reproducing a track, data from the start address of the slot 586×1 needs to be reproduced next to the end address represented in the slot 78×1, the link information Link-P of the slot 80×4 specifies the slot 581×1.

That is, in the optical disc D, data need not necessarily be recorded on the recording medium, that is as a continuous data stream, but a sequential data string may be recorded discretely. If data is recorded discretely, data continuity is indicated by this link information P-Link, such that, by transiently storing read-out data in a memory during reproduction and by writing data in the memory at a quicker rate than the data read-out rate, continuous data can be reproduced without interruptions.

If data shorter than the recorded program is overwritten on the previously recorded data, efficient recording can be achieved by specifying the redundant area asa recordable area (P-FRA) without erasing the redundant area.

Figure 7:
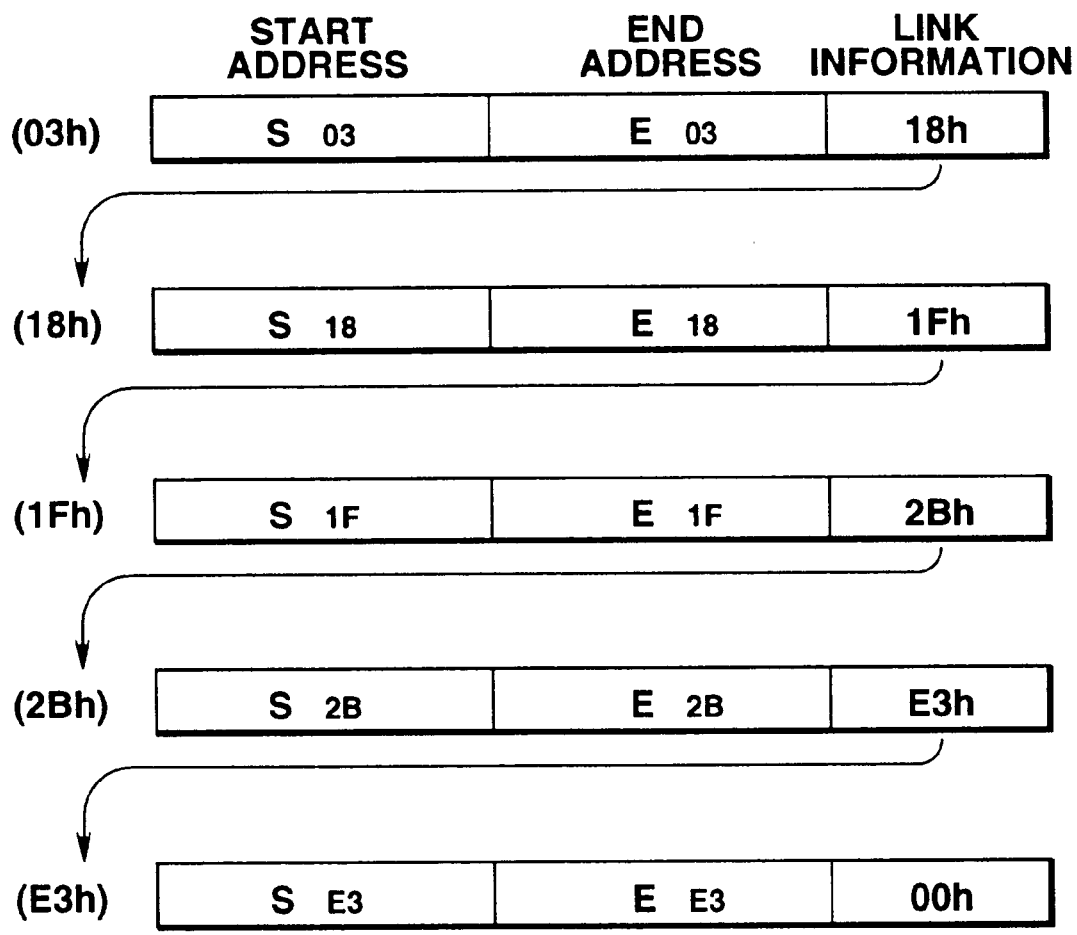
FIG. 7 is a diagrammatic view showing the linking state of each slot on a U-TOC which is a management area on a magneto-optical disc embodying the present invention.

The method for linking discrete areas is now explained with reference to FIG. 7 taking an example of the recordable area P-FRA.

If 03h (hexa-decimal) is recorded in P-FRA specifying the leading end position of the slot managing the recordable area of U-TOC0, the slot associated with 03h is first accessed.

The start and end address recorded in the slot 03h specify a start point address and an end point address of a fractional portion in a track recorded on the disc.

The link information recorded in the slot 03h specifies the slot number of the next following slot and herein 18h.

The area specified by the start point address and the end point address of the slot 18h specified by the link information of the slot 03h can be judged to be a recordable area. Further, by tracing the slot 1Fh stated in the link information of the slot 18h, the area specified by the start point address and the end point address of the slot 1Fh can be judged to be a recordable area.

Further, by tracing the slot 2Bh stated in the link information of the slot 1Fh, the area specified by the start point address and the end point address of the slot 1Fh can be judged to be a recordable area. By tracing slot addresses recorded in the link information as described above, slots are traced until the link information is equal to 00h.

By tracing the slots beginning from a slot specified by P-FRA until the link information is equal to Null (=00h), it is possible to link on the memory plural fractional parts making up a track discretely recorded on the disc.

Although P-FRA is taken as an example for explanation, discretely present fractional parts can be similarly linked for P-DFA, P-EMPTY, and P-TNO) 0 to 255.

FIG. 8 shows data recorded on the U-TOC1.

In the U-TOC1, the title of each track and title of the optical disc D in its entirely are managed.

If the recording track is audio data, the title of the optical disc D in its entirety and the title of each track correspond to the album title and the name of the performer and to the name of the musical number, respectively.

The letter information for each track is recorded in the slot specified by P-TNAn (n is 1 to 255), and if there are a large number of letters, the link information is used to connect plural slots for recording.

FIG. 9 shows data recorded on the U-TOC2.

In U-TOC2, the recording time and data for each program recorded in the program area is managed in the similar configuration to the above-mentioned U-TOC0.

FIG. 10 shows data recorded in the U-TOC4.

In U-TOC4, the title of each program recorded in the program area is managed in the similar configuration to the above-mentioned U-TOC0 so that the Japanese syllabic characters and kanji can be used as fonts of the entire title of the entire optical disc D.

Figure 11:
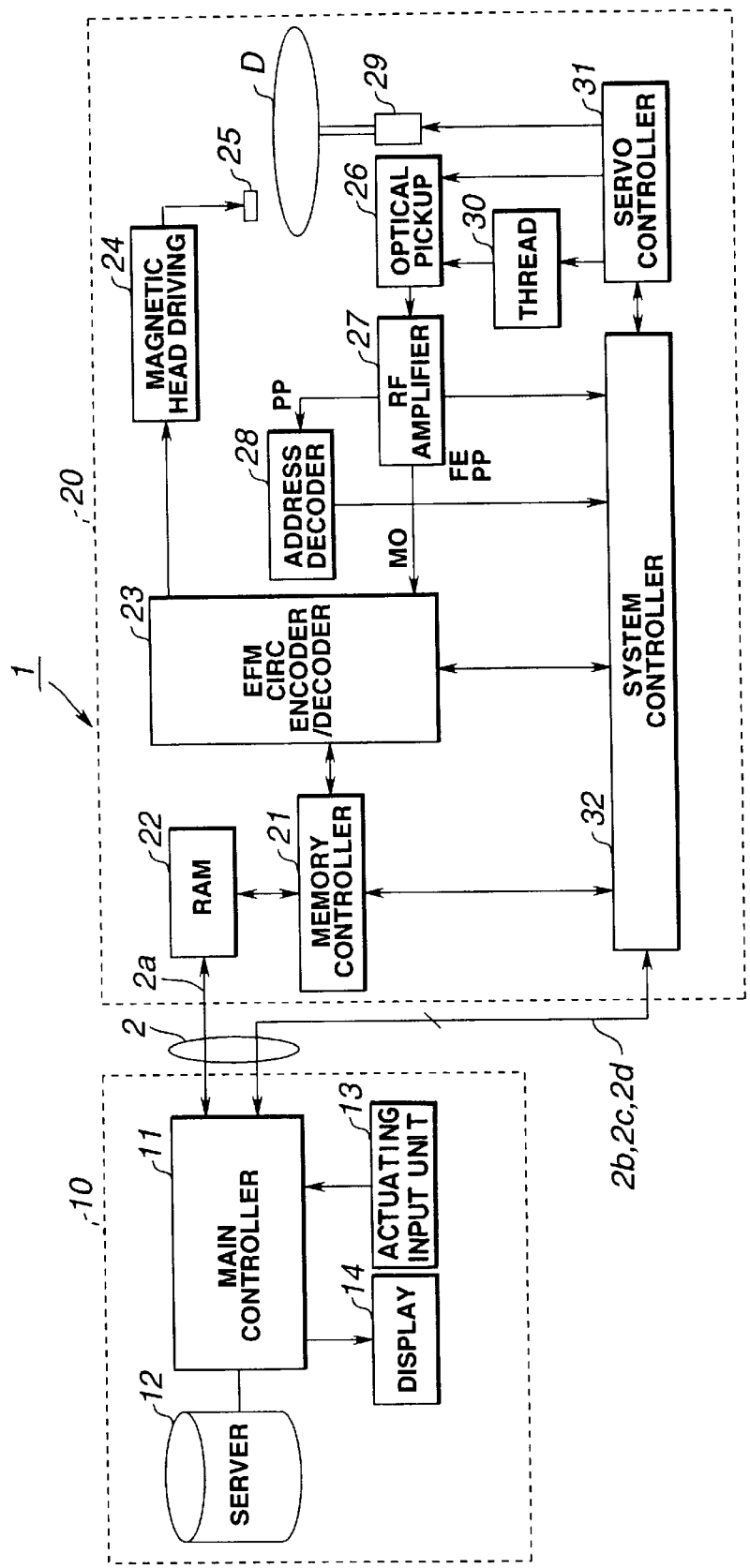
FIG. 11 is a detailed block diagram of a recording device shown in FIG. 1.

Referring to FIG. 11, the configuration of the audio dubbing system 1, added to with that of the recording unit 20 as described above, will be explained in detail.

FIG. 11 shows the block diagram of the audio dubbing system 1 embodying the present invention. This audio dubbing system 1 is made up of an audio transfer unit 10, recording unit 20 and a connection cable 2 interconnecting the audio dubbing system 1 and the recording unit 20. The audio transfer unit 10 has a main controller 11, a server 12, actuating input unit 13 and a display unit 14. The recording unit 20 is used for recording audio data in a portable type recording medium.

The recording unit 20 includes a Random-Access Memory (RAM) for storing data sent from the audio transfer unit 10, and a memory controller 21 for controlling the RAM 22. The recording unit 20 also includes an encoding/decoding circuit 23 for decoding and encoding data and a magnetic head driving circuit 24 for driving a magnetic head 25 and an optical pickup 26 for illuminating the laser light on the optical disc D for detecting the reflected light. The recording unit 20 also includes a RF amplifier 27 for reproducing the Focusing Error signals (FE), Push-Pull signals (PP) and Magneto-optical playback signals (MO) from the reflected light detected from the optical pickup 26. The recording unit 20 also includes an address decoder 28 for reproducing signals corresponding to the wobbling of the groove formed in the guide groove of the optical disc D based on the Push-Pull signals (PP) from the RF amplifier 27 for decoding the ADIP and a spindle motor 29 for rotationally driving the optical disc D. The recording unit 20 further includes a thread unit 30 for radially moving the optical pickup26 along the radium of the optical disc D.

The recording unit 20 includes a servo circuit 31 for controlling the focusing servo, thread servo and spindle servo based on the Focusing Error signals (FE) and the Push-Pull signals (PP) and a system controller 32 for controlling the memory controller 21, encoding/decoding circuit 23 and the servo circuit 31.

The optical pickup 26 illuminates the laser light on the optical disc D from the laser diode via an objective lens. The optical pickup 26 also detects the reflected light from the optical disc D by a photodetector to send the detection current to the RF amplifier 27.

The RF amplifier 27 generates the Focusing Error signals (FE), Push-Pull signals (PP) and the Magneto-optical playback signals (MO) based on the detection current from the photodetector. The RF amplifier 27 sends the generated Focusing Error signals (FE) to the servo circuit 30, while sending the Push-Pull signals (PP) to the address decoder 28 and the servo circuit 30, while sending the Magneto-optical playback signals (MO) to the encoding/decoding circuit 23.

The servo circuit 31 drives the objective lens via a biaxial unit of the optical pickup 26, based on the furnished Focusing Error signals (FE) and the Push-Pull signals (PP), in order to perform tracking and focusing servo control of the light beam radiated to the optical disc D. The servo circuit 31 drives a thread unit 30 based on the Push-Pull signals (PP) to perform thread servo control for driving the optical pickup 26 radially of the optical disc D. The servo circuit 31 performs spindle servo control of driving the spindle motor 29 to cause the optical disc D to be rotated at a Constant Linear Velocity (CLV) based on the spindle error signals from an optical disc rotation detection circuit, not shown.

The address decoder 28 regenerates the address information from the wobbled signals corresponding to the groove wobbling formed in the guide groove of he optical disc D.

The encoding/decoding circuit 23 converts the Magneto-optical playback signals (MO) from the RF amplifier 27 into bi-level signals and decodes the bi-level signals in accordance with the Eight-to-Fourteen Modulation (EFM) system while also decoding error correction in accordance with the Cross-Interleaved Reed-Solomon Coding (CIRC). The encoding/decoding circuit 23 appends error correction codes to the recording signals supplied from the memory controller 21 in accordance with the CIRC system and modulates the resulting signal in accordance with the EFM system to send the recording signal to the magnetic head driving circuit 24.

The magnetic head driving circuit 24 drives the magnetic head 25 based on recording signals from the encoding/decoding circuit 23 to apply a modulating magnetic field on the optical disc D by way of recording the recording signals.

The memory controller 21 controls the writing and readout of the ATRAC data to be stored on the RAM 22. This memory controller 21 causes the ATRAC data supplied from the audio transfer unit 10 transiently in the RAM 22 to send the transiently stored data subsequently to the encoding/decoding circuit 23.

The system controller 32 performs control of the recording unit 20 in its entirety. For example, the system controller 32 controls the memory controller 21, encoding/decoding circuit 23 and the servo circuit 31. The system controller 32 also controls the circuits adapted for exchanging controller data with the audio transfer unit 10, as will be explained subsequently.

By the above structure, the recording unit 20 of the audio dubbing system records ATRAC data sent from the audio transfer unit 10 on the optical disc D.

The data exchanging method between the audio transfer unit 10 and the recording unit 20 of the audio dubbing system 1 will now be explained with reference to FIGS. 12A to 12C.

The audio dubbing system 1 has the connection cable 2 interconnecting the audio transfer unit 10 and the recording unit 20. The connection cable 2 is made up of an ATRAC line 2a for sending the ATRAC data as compressed audio data sent from the audio transfer unit 10 to the recording unit 20 and a Data Req line 2b for sending the ATRAC data request signal (Data Req) sent from the recording unit 20 to the audio transfer unit 10.

The ATRAC data corresponding to the contents stored in the server 12 are sent over the ATRAC line 2a from the main controller 11 of the audio transfer unit 10 to the memory controller 21 of the recording unit 20. Also, an ATRAC data request signal (Data Req) specifying a request of the ATRAC data is sent from the system controller 32 of the recording unit 20 over the Data Req line 2b to the main controller 11 of the audio transfer unit 10. That is, since the ATRAC data is transferred in terms of a pre-set volume as a unit, the recording unit 20 sends this request signal (Data Req) to the audio transfer unit 10 to make a request for the next data if all of the ATRAC data already transferred and written into RAM 22 have been written in their entirety on the optical disc D. If the ATRAC data read into the RAM 22 have not been recorded on the optical disc D, the request signal to the audio transfer unit 10 is set to a transfer stand-by state.

Figures 12A, 12B, 12C:
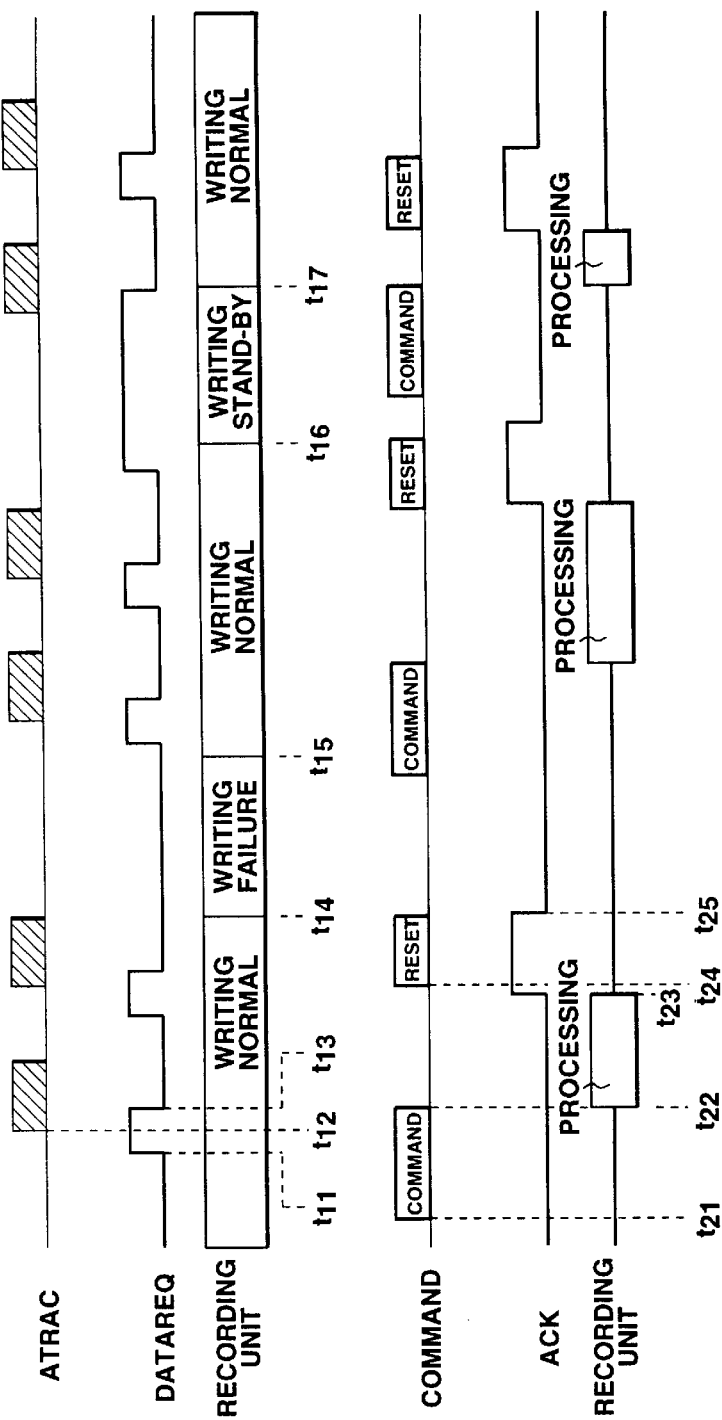
FIG. 12A is a block diagram showing the connecting state between an audio transferring unit 10 and a recording unit 20 according to the present invention.
FIG. 12B is a timing chart for illustrating compressed audio data ATRAC sent from the audio transferring unit 10 to the recording unit 20, a request signal Data Req sent from the recording unit 20 to the audio transferring unit 10 and the processing timing on the recording unit.
FIG. 12C is a timing chart for illustrating a command signal Command Sent from the audio transferring unit 10 to the recording unit 20, an acknowledgment signal ACK sent from the recording unit 20 to the audio transferring unit 10 and the processing timing on the recording unit.

The time chart of FIG. 12B shows the relation between the ATRAC data and the request signal (Data Req).

If the recording state of the recording unit 20 is regular, the recording unit 20 sends the request signal (Data Req) at time $t_{11}$ to the audio transfer unit 10. When fed with the request signal (Data Req), the audio transfer unit 10 starts to supply the ATRAC data of a pre-set amount to the recording unit 20 at time $t_{12}$. When fed with the ATRAC data, the recording unit 20 halts the supply of the request signal (Data Req) at time $t_{13}$.

Also, if the recording state of the recording unit 20 is not regular, no request signal (Data Req) is sent from the recording unit 20 to the audio transfer unit 10, as indicated at time $t_{14}$ to $t_{15}$, so that no ATRAC data is transferred from the audio transfer unit 10 to the recording unit 20. If the request signal (Data Req) is not sent from the recording unit 20 for a pre-set time on end, the audio transfer unit 10 discontinues the recording operation.

The time domain from time $t_{15}$ until time $t_{16}$ specifies the time duration during which the supply of the ATRAC data to the recording unit 20 is normal.

If the request signal (Data Req) is sent as indicated from time $t_{16}$ until time $t_{17}$, but the ATRAC data is not sent for a pre-set time from the audio transfer unit 10, the recording unit 20 sets the data writing standby state, for example, the recording paused state, in order to await the ATRAC data. If the ATRAC data is sent, the recording unit 20 initiates the writing operation as indicated as from time $t_{17}$. If the writing standby state continues for a pre-set time on end, the audio dubbing system 1 judges that some trouble has occurred to discontinue the processing.

Thus, the audio dubbing system 1 can record ATRAC data reliably by the recording unit 20 issuing the ATRAC data request signal (Data Req) to the audio transfer unit 10.

The audio dubbing system 1 also has a command line COMMAND 2c for transferring the control command or other command data such as the TOC information supplied from the audio transfer unit 10 to the recording unit 20 and an ACK line 2d for transferring an acknowledgment signal (ACKNOWLEDGE) to the command data from the audio transfer unit 10 to the recording unit 20, as shown in FIG. 12A.

The TOC information generated by the main controller 11 of the audio transfer unit 10 or the command data such as data sizes of the ATRAC data of various contents are sent over the command line 2c to the system controller 32 of the recording unit 20. If the recording unit 20 has terminated the processing relevant to the command data, the acknowledgment signal (ACKNOWLEDGE) is set over the ACK line 2d from the system controller 32 of the recording unit 20 to the main controller 11 of the audio transfer unit 10.

Specifically, the relation between the command data and the acknowledgment signal (ACKNOWLEDGE) is shown in the timing chart of FIG. 12C.

First, the audio transfer unit 10 sends pre-set command data at time $t_{21}$ to the recording unit 20. When the supply of the command data comes to a close, the recording unit 20 performs processing relevant to the supplied command data at time $t_{22}$. When the processing relevant to the supplied command data comes to a close, the recording unit 20 sends the acknowledgment signal (ACKNOWLEDGE) at time $t_{23}$ to the recording unit 20. On reception of the acknowledgment signal (ACKNOWLEDGE), the audio transfer unit 10 sends a reset command at time $t_{24}$ to the recording unit 20. On reception of the reset command, the recording unit 20 terminates the supply of the acknowledgment signal (ACKNOWLEDGE) at time $t_{25}$. If the command data has been supplied but the acknowledgment signal (ACKNOWLEDGE) is not supplied for a pre-set time from the recording unit 20, the audio transfer unit 10 deems that some trouble has occurred and accordingly interrupts the processing.

The following Table 1 shows command data supplied from the audio transfer unit 10 to the recording unit 20 over the COMMAND line 2.

TABLE 1

| command name | data of command (1 byte) | function |
| --- | --- | --- |
| SETUP | 1 | set recording unit 10 to recording pause state |
| START | 2 | start recording |
| STOP | 3 | terminate processing |
| TOC0info | 4 | TOC0 information (track size and track mode) |
| ACK-RESET | 8 | ACK reset |
| ALRIGHT | 0b | recording state confirmed |
| Title | 83 | title information |

The setup command (SETUP) is a command for setting the recording unit 20 in the recording standby state, that is the recording pause state. On reception of the setup command (SETUP), the recording unit 20 is in the recording pause state. Specifically, this setup command (SETUP) is given as "01" data of 1 byte.

The start command (START) is a command specifying the recording start of the ATRAC data. On reception of the start command (START), the recording unit 20 initiates recording of the ATRAC data on the optical disc D. Specifically, this start command (START) is given as "02" data of 1 byte.

The stop command (STOP) is a command specifying the end of processing of the recording unit 20 relevant to the commands. On reception of the stop command (STOP), the recording unit 20 halts recording initiated by the start command (START). Specifically, this stop command (STOP) is given as "03" data of 1 byte.

The TOC0 information command (TOC0inf) is a command specifying the information recorded in the U-TOC sector 0 of the optical disc D. On reception of the TOC0 information command (TOC0inf) and the information on the track size and track mode next to the command, the recording unit 20 finds the recorded start and end addresses of the ATRAC data from the track size to record the TOC data in the U-TOC.

That is, the TOC0 information is inherently generated by the recording unit 20 itself so as to be recorded on the optical disc D. However, if ATRAC data of plural contents are supplied from the audio transfer unit 10, these data are sent as a continuous data stream to the recording unit 20, so that junction points between the contents cannot be distinguished and hence the track information cannot be generated. Therefore, the audio transfer unit 10 sends the track mode and the track size, indicating the data size specifying the data stream length of data corresponding to the respective contents, as the TOC0 information command (TOC0info). Based on the TOC0 information command (TOC0info), the recording unit 20 generates the TOC0 information to be recorded on the optical disc D.

Specifically, the track number TOC0 information command (TOC0info) is given as 1-byte "04" data.

The command (TNO) is a command specifying the track number of the ATRAC data to be recorded. On reception of the Track Number Command (TNO) and the track number next following the command, the recording unit 20 performs processing for the next following title command (Title) on the track number. Specifically, the Track Number Command (TNO) is given as 1-byte "05" data.

The reset command (ACK-RESET) is a command for resetting the acknowledgment signal (ACKNOWLEDGE) supplied from the recording unit 20. When fed with the reset command (ACK-RESET), the recording unit 20 halts the supplying of the acknowledgment signal (ACKNOWLEDGE). Specifically, the reset command (ACK-SET) is given as 1-byte "08" data.

The recording state confirming command (ALRIGHT) is a command for confirming the recording surface of the recording unit 20. On reception of the recording state confirming command (ALRIGHT), the recording unit 20 sends the acknowledgment signal (ACKNOWLEDGE) to the audio transfer unit 10. Specifically, the recording state confirming command (ALRIGHT) is given as 1-byte "0b" data.

The title (Title) command is a command which furnishes the title information to be recorded in the TOC1 and TOC4 of the optical disc 4. Next to the title command (Title), the letter string information and character data are supplied. On reception of the letter string information and character data, the recording unit 20 records the title information for each track in TOC1 and TOC2 of the optical disc D. Specifically, the title command (Title) is given as as 1-byte "83" data.

The processing contents of the audio dubbing system 1 are explained with reference to a flowchart shown in FIG. 13.

Figure 13:
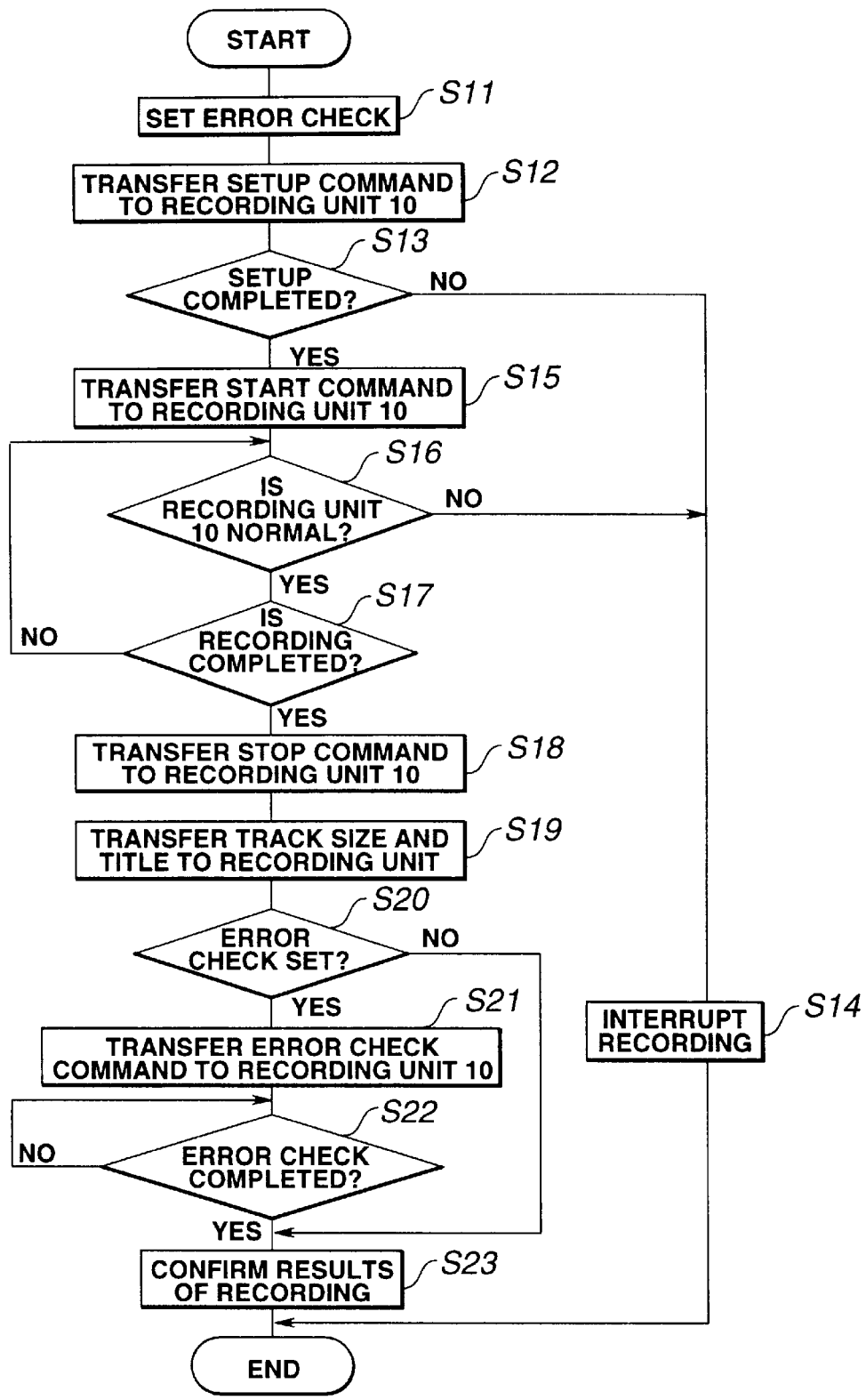
FIG. 13 is a flowchart for illustrating the dubbing processing by the recording unit 20 embodying the present invention.

When the user selects one or more contents to be recorded from the server 12 on the optical disc D and terminates the initial setting operations, such as loading of the optical disc D on the recording unit 20, the audio dubbing system 1 starts the processing as from step S11 shown in FIG. 13.

At step S11, the audio dubbing system 1 inquires the user whether or not an error check is to be performed by the display unit 14. IF the user enters whether or not the error check is to be made using the actuating input unit 13, processing transfers to step S12. This error check will be explained in detail subsequently.

At step S12, the audio transfer unit 10 furnishes the setup command (SETUP) via a COMMAND line 2c to the recording unit 20. When the setup command (SETUP) is supplied from the audio transfer unit 10, the recording unit 20 sets the recording state on the optical disc D in the recording paused state and sends the acknowledgment signal (ACKNOWLEDGE) via ACK line 2d to the audio transfer unit 10. At step S13, the audio transfer unit 10 checks to see whether or not the acknowledgment signal (ACKNOWLEDGE) has been sent from the recording unit 20. If the acknowledgment signal (ACKNOWLEDGE) has been sent, processing transfers to step S15. If the acknowledgment signal (ACKNOWLEDGE) has not been sent for a pre-set time, processing transfers to step S14.

At step S14, the audio transfer unit 10 deems that recording on the optical disc D by the recording unit 20 is disabled by some trouble and displays an error message on the display 14 to terminate the processing.

At step S15, the audio transfer unit 10 sends the start command (START) over the COMMAND line 2c to the recording unit 20. On reception of the request signal (Data Req), the audio transfer unit 10 sends ATRAC data to the recording unit 20 every pre-set capacity. On reception of the ATRAC data, the recording unit 20 records data in the recordable area of the optical disc D.

Meanwhile, if plural tracks are designated by the user, that is if plural contents are designated, the audio transfer unit 10 sends the ATRAC data as a continuous data stream to the recording unit 20. The recording unit 20 also pre-stores the TOC information of the disc in the external memory or the like so that, if recording on the optical disc is not carried out regularly, the optical disc D can be restored to the pre-recording disc state.

If recording of the ATRAC data is started at step S15, processing transfers to step S16.

At step S16, the audio transfer unit 10, the audio transfer unit 10 sends the recording state confirming command ALRIGHT over the COMMAND line 2c to confirm the recording state of the recording unit 20. If the audio transfer unit 10 is fed from the recording unit 20 with the acknowledgment signal (ACKNOWLEDGE) and has confirmed that the recording state is normal, processing transfers to step S17 to confirm that the recording has come to a close. If the recording has not come to a close, processing reverts to step S16 to confirm whether or not recording has been performed regularly. That is, the processing of steps S16 to S17 confirms, at a pre-set interval, whether or not recording has been normal and whether or not recording has come to a close.

If it is deemed by the recording unit 20 that the recording has not been regular, processing transfers from step S16 to step S14 to interrupt the recording processing. At this time, the previous TOC information reserved in the external memory or the like is rewritten on the optical disc D for restoring the optical disc D to the pre-recording state.

If it is judged that the recording has come to a close, processing transfers from step S17 to step S18.

At step S18, the audio transfer unit 10 sends a stop command (STOP) over the COMMAND line 2c to the recording unit 20. On reception of the STOP command, the recording unit 20 terminates the recording of the ATRAC data. When the STOP command is fed at step S18, processing transfers to step S19.

At step S19, the audio transfer unit 10 furnishes the TOC0 information command (TOC0info), track size information, title command (Title), number of letters of the title and character data or the like necessary TOC information as well as Track Number Command (TNO).

On reception of the TOC information, the recording unit 20 records data from the U-TOC0 to the U-TOC4 of the optical disc D, based on the furnished TOC information. Meanwhile, the start address and the end address of each track are generated on the basis of the track size information supplied next to the TOC0 information command (TOC0info). That is, since the ATRAC data is furnished as a sole data stream, this data stream is divided from track to track into data sizes to generate the TOC information.

After furnishing the necessary TOC information at step S19, processing transfers to step S20.

At step S20, the audio transfer unit 10 judges whether or not the user has set for performing an error check at the previous step S11. If the user set for performing an error check, processing transfers to step S21 and, if otherwise, processing transfers to step S23.

At step S21, the audio transfer unit 10 sends an error check command over the COMMAND line 2c to the recording unit 20. On reception of the error check command, the recording unit 20 reads out the recorded ATRAC data to inspect whether or not there is any error in the recorded data.

When the error check by the recording unit 20 is started, the audio transfer unit 10 is in stand-by state at step S22 until the error check comes to a close. On termination of the error check, processing transfers to step S23.

At step S23, the audio transfer unit 10 displays the results of the test on the display unit 14. If the result of the error check has revealed that there is any error caused in the recorded data, the pre-recording TOC information reserved in, for example, the external memory, is recorded on the optical disc D.

After displaying the test results at step S23, the audio dubbing system 1 terminates the processing.

By processing from step S11 to step S23, the audio dubbing system 1 can positively record the ATRAC data on the optical disc D.

In the above-described processing from step S11 to step S23, the necessary TOC information is sent to the recording unit 20 after recording all of the ATRAC data. However, the audio dubbing system 1 can also send the TOC information before the audio transfer unit 10 sends the ATRAC data to the recording unit 20.

That is, the processing of step S19 is performed after terminating the setup and before sending the start command (START), that is between the processing at step S13 and that at step S15. Since the TOC information is recorded by the recording unit 20 after recording the ATRAC data on the optical disc D, the TOC information previously furnished needs to be stored in, for example, the external memory. By previously holding the TOC information in, for example, the external memory before recording the ATRAC information, the name of the musical number to be recorded can be displayed on the display unit.

It is also possible with the audio dubbing system 1 to furnish the TOC information in parallel at the same time as the audio transfer unit 10 is furnishing the ATRAC data to the recording unit 20.

That is, since the ATRAC data and the commands are sent separately over the ATRAC line 2a and over the COMMAND line 2c, the processing of step S16 and S17 and that of step S19 can be carried out in parallel thus shortening the data transfer time. It is similarly necessary in this case for the recording unit 20 to save the TOC information in, for example, the external memory, so that the TOC information will be recorded on the optical disc D after recording all of the ATRAC data.

In the above-described processing from step S11 to step S23, the ATRAC data corresponding to plural contents are handled as a sole data stream and the information required for generating the TOC information is sent separately from the audio transfer unit 10 to the recording unit 20. However, when plural contents are specified by the user, it is also possible for the audio dubbing system 1 to record ATRAC data corresponding to a sole contents on the optical disc D, generate and record the TOC of the subsequently recorded ATRAC data and to record the ATRAC data corresponding to the further following contents.

The above processing can be realized by the processing from step S15 to step S19 constituting a loop repeated from one contents to another.

Specifically, the recording of two musical numbers of the musical contents on the optical disc D is hereinafter explained by referring to a timing chart.

Figures 14A, 14B:
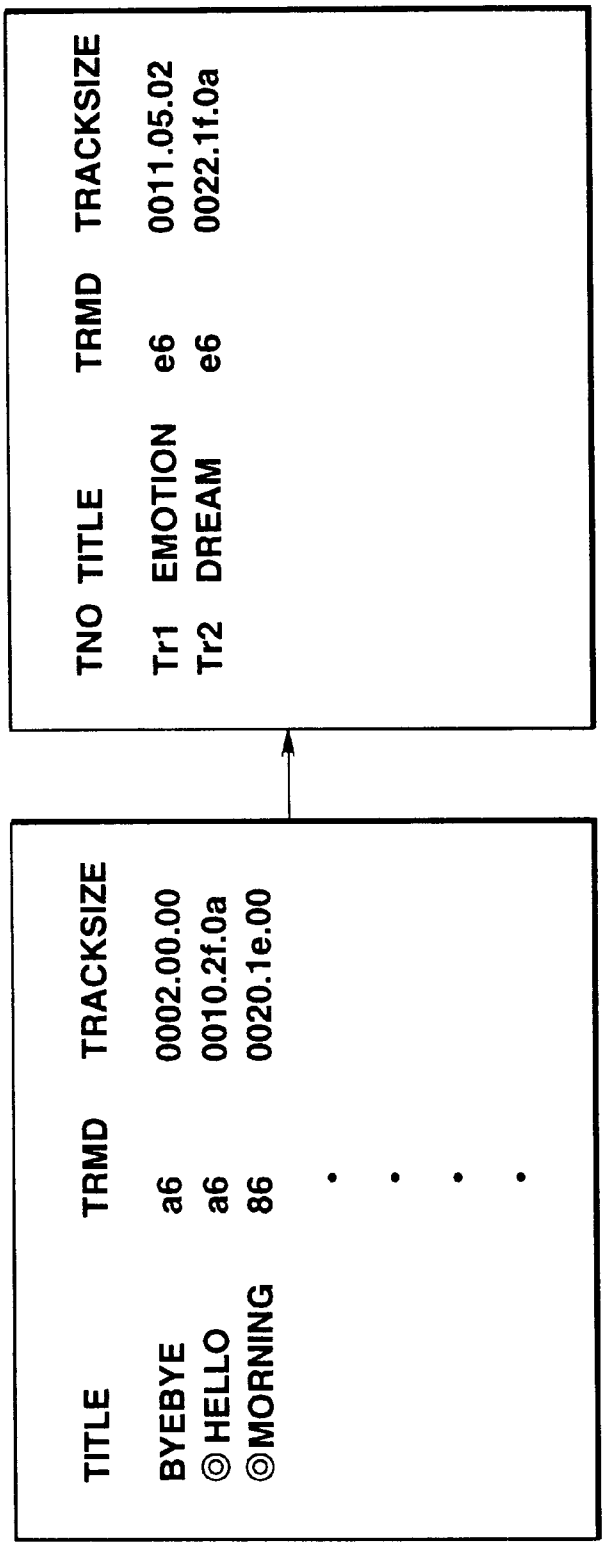
FIG. 14A shows the management information for the music program stored in a server embodying the present invention.
FIG. 14B shows the management information for the music program recorded on an optical disc D embodying the present invention.

Referring to FIG. 14A, there are stored in the server 12 first contents having a title "Bye-bye", a track mode (trmd) of "a6" and a track size of "0002.00.00", second contents having a title "Hello", a track mode (trmd) of "a6" and a track size of "0010.2f0a" and third contents having a title "Morning", a track mode (trmd) of "86" and a track size of "0020.1e.00".

On the optical disc D as a recording medium, there are recorded two musical numbers, namely a first track having the title "Emotion", a track mode (trmd) of "e6" and a track size "0011.05.02" and a second track having the title "Dream", a track mode (trmd) of "e6" and a track size "0022.1f.0a".

For recording the second contents (ATRAC data having the title "Hello") and the third contents (ATRAC data having the title "Morning"), indicated by ⓞmarks in FIG. 14A, stored in the server 12, the processing is carried out as shown in FIGS. 15A to 15E, 16A to 16E, 17A to 17E and 18A to 18E.

FIGS. 15A to 15E show a timing chart for command data between the audio transfer unit 10 and the recording unit 20 when transferring ATRAC data.

First, the recording unit 20 sends a setup command (SETUP) at time $t_{31}$ to the recording unit 20. On reception of the setup command (SETUP), the recording unit 20 sets up a recording caused state and furnishes the acknowledgment signal (ACKNOWLEDGE) at time $t_{32}$ to the audio transfer unit 10. On reception of the acknowledgment signal (ACKNOWLEDGE), the audio transfer unit 10 furnishes the reset command (ACK-RESET) to the recording unit 20 to reset the acknowledgment signal (ACKNOWLEDGE).

The audio transfer unit 10 furnishes at time $t_{33}$ a start command (START) to the recording unit 20. This furnishing of the start command (START) corresponds to the above-mentioned processing at step S15. On reception of the start command (START), the recording unit 20 starts the recording operation, at the same time as it furnishes the acknowledgment signal (ACKNOWLEDGE) and the request signal (Data Req) to the audio transfer unit 10.

Based on the request signal (Data Req), the audio transfer unit 10 starts supplying at time $t_{34}$ the ATRAC data of a pre-set capacity, that is the second contents (ATRAC data having a title "Hello" and the third contents (ATRAC data having the title "Morning"), to the recording unit 20. For furnishing ATRAC data every pre-set capacity, the audio transfer unit 10 sequentially furnishes the ATRAC data to the recording unit 20 based on the request signal (Data Req) supplied at time points $t_{35}$, $t_{36}$, $t_{37}$ and $t_{38}$ from the recording unit 20.

The audio transfer unit 10 furnishes the recording state confirming command (ALRIGHT) at a pre-set interval to check to see whether or not the recording state of the recording unit 20 is normal. This furnishing of the recording state confirming command (ALRIGHT) to see whether or not the recording state of the recording unit 20 is normal corresponds to the processing at the above-mentioned processing at step S16.

When the audio transfer unit 10 judges that all ATRAC data has been sent to the recording unit 20, it sends the stop command (STOP) at time $t_{39}$ to the recording unit 20. The processing of furnishing the stop command (STOP) corresponds to the processing at step S18. If the stop command (STOP) is furnished and the furnished ATRAC data in its entirety is recorded on the optical disc D, the recording unit 20 terminates the recording at time $t_{40}$ while furnishing the stop command (STOP) to the audio transfer unit 10.

FIGS. 16A to 16E show a timing chart of the TOC0 information command (TOC0info) sent at the above-mentioned step S20 from the audio transfer unit 10 to the recording unit 20. FIGS. 16A and 16B show a time chart of data sent from the audio transfer unit 10 to the recording unit 20 and a recording state of the U-TOC0 of the optical disc D at each time point.

It is assumed that the newly dubbed musical number is provisionally registered in the U-TOC as the third track next to the previously recorded first and second tracks.

At a time point $t_{51}$ when no TOC0 information command (TOC0info) is supplied, there are recorded in the U-TOC0 of the optical disc D the start address, end address and the track mode of the previously recorded first and second tracks (tracks having the titles "Emotion" and "Dream") and the start and end addresses of the provisionally recorded third track.

The audio transfer unit 10 furnishes at time $t_{52}$ the track mode and the track size of the first contents. That is, the audio transfer unit 10 furnishes, along with the TOC0 information command (TOC0info), the number of the contents of the ATRAC data having the title "Hello", the track mode of the contents and the track size of the contents.

On reception of the track mode and the track size of the first contents, the recording unit 20 generates the U-TOC0 information, based on the furnished information, to record the generated information on the optical disc D. Thus, at time $t_{53}$, the track mode, start address and the end address associated with the first contents are recorded in TOC0 of the optical disc D.

The audio transfer unit 10 then sends at time $t_{53}$ the track mode and the track size of the second contents. That is, the audio transfer unit 10 sends, along with the TOC0 information command (TOC0info), the contents number of the ATRAC data having the title "Morning", as well as the tack mode and the track size of the contents.

On reception of the track mode and the track size of the second contents, the recording unit 20 generates the U-TOC0 information based on the furnished information to record the generated information on the optical disc D. Thus, at time $t_{54}$, the track mode, start address and the end address associated with the second contents are recorded in the U-TOC0 of the optical disc D.

The audio transfer unit 10 sends at time $t_{55}$ a stop command (STOP). On reception of the stop command (STOP), the recording unit 20 judges that the processing corresponding to the previously furnished TOC0 information command (TOC0info) has come to a close and proceeds to the processing of deleting the surplus based on the assumption that there is no data downstream of the end address corresponding to the second contents.

Thus, at time $t_{56}$, there is recorded in the U-TOC0 of the optical disc D the track having the title "Hello" and the track having the title "Morning" in succession along with the previously recorded U-TOC0 data of the first and second tracks.

FIGS. 17A to 17D and 18A to 18D are time charts for the title information supplied at the above-mentioned step S20 from the audio transfer unit 10 to the recording unit 20. Meanwhile, FIGS. 17A and 18A show time charts of data furnished from the audio transfer unit 10 to the recording unit 20 and FIGS. 17B and 18B show the recording states of the U-TOC1 and 4 of the optical disc D at each time point.

Referring to FIG. 17D, there are recorded only the previously recorded titles of the first and second tracks in the U-TOC1 and U-TOC4 of the optical disc D at the time point $t_{61}$ when the title command (Title) is not supplied.

The audio transfer unit 10 sends at time $t_{62}$ the title of the first contents. That is, the audio transfer unit 10 sends the contents number of the ATRAC data number of letters supplied and letter data of the title "Hello" of the contents, along with the title command (Title).

On reception of the title of the first contents, the recording unit 20 generates the information of U-TOC1 and U-TOC4, based on the furnished information, to record the generated information on the optical disc D.

Meanwhile, if the number of letters of the title is larger than the prescribed value, processing is executed in plural installments. That is, if data for four letters only can be furnished, the four letters of "Hell" are first sent and the letter "o" is then sent at time $t_{64}$.

Thus, at time $t_{65}$, the title corresponding to the first contents is recorded on the U-TOC1 and U-TOC4 of the optical disc D.

The audio transfer unit 10 then furnishes the title of the second contents at time $t_{66}$ in FIG. 18D. That is, the audio transfer unit 10 furnishes, along with the title command (Title), the contents number of the ATRAC data, the number of letters furnished and the letter data of the title "Morning" of the contents. On reception of the second contents, the recording unit 20 generates the information of U-TOC1 and U-TOC4, based on the furnished information, in order to record the generated information on the optical disc D.

Thus, at time $t_{65}$, there is recorded on U-TOC1 of the optical disc D a title corresponding to the second contents.

When the recording unit 20 terminates the recording of all titles, the audio transfer unit 10 sends a stop command (Stop) at time $t_{68}$ to terminate the processing.

By the above processing, the audio dubbing system 1 can record the TOC information on the optical disc D. That is, there can be recorded on the optical disc D the third track with the title "Hello", the fourth track with the title "Morning" recorded from the server 12 and the ATRAC information along with the previously recorded first track with the title "Emotion" and second track with the title "Dream".

With the audio dubbing system 1, as described above, the audio transfer unit 10 transfers the track size of each track along with the ATRAC data and the recording unit 20 splits the data stream recorded on the optical disc D to record the start address and the end address of each track on U-TOC of the optical disc D. This allows the audio dubbing system 1 to record efficiently the track selected by the user on the optical disc D. The recording unit 20 records the ATRAC data as a track responsive to the transferred data stream, while recording the start and end addresses of each track on the optical disc D in the style of splitting the data stream of this one track for improving the utilization efficiency of the optical disc D.

Although the foregoing description has been made for the case of recording audio data on a magneto-optical disc, the present invention may also be applied to recording of video data instead of audio data. The recording medium may also be a recording medium other than the magneto-optical disc if the recording medium is capable of random accessing.

What is claimed is:

1. A recording apparatus for recording at least a compressed audio program on a recording medium having a management area and a recordable area, comprising:

receiving means for receiving said compressed audio program and capacity size data corresponding to the size of said compressed audio program transmitted via a transfer path;

recording means for recording said compressed audio program from said receiving means in said recordable area of said recording medium; and generating means for generating said management information including start and end addresses of said compressed audio program in accordance with said capacity size data;

wherein said recording means records said management information including said start and end addresses of said compressed audio program in said management area of said recording medium.

2. The recording apparatus as claimed in claim 1 wherein said receiving means receives identification data corresponding to said compressed audio program transmitted via said transfer path and said recording means records said identification data in said management area of said recording medium.

3. The recording apparatus as claimed in claim 2 wherein the identification data is at least one of copy protection information, copy generation information, audio channel information and emphasis data.

4. The recording apparatus as claimed in claim 1 wherein said receiving means receives a program name corresponding to said compressed audio program transmitted via said transfer path and said recording means records said program name in said management area of said recording medium.

5. The recording apparatus as claimed in claim 4 further comprising:

memory means for storing said program name corresponding to said compressed audio program to be recorded, said program name being received prior to reception of said compressed audio program to be recorded.

6. The recording apparatus as claimed in claim 4 wherein said program name corresponding to said compressed audio program to be recorded is received subsequent to reception of said compressed audio program to be recorded.

7. The recording apparatus as claimed in claim 4 wherein said compressed audio program and said program name corresponding to said compressed audio program to be recorded are received alternatively.

8. The recording apparatus as claimed in claim 1 wherein said receiving means further receives a number of characters representing a program name via said transfer path said recording means records said program name in said management area of said recording medium.

9. The recording apparatus as claimed in claim 1 wherein said capacity size data corresponding to the size of said compressed audio program to be recorded is received prior to reception of said compressed audio program to be recorded.

10. The recording apparatus as claimed in claim 1 wherein said capacity size data corresponding to said compressed audio program to be recorded is received subsequent to reception of said compressed audio program to be recorded.

11. The recording apparatus as claimed in claim 1 wherein said compressed audio program and said capacity size data corresponding to the size of said compressed audio program to be recorded are received alternately.

12. A transfer/reception system having a transferring system for transferring at least one compressed audio program and a receiving system for receiving a transferred compressed audio program, said transferring system comprising:

generating means for generating a program capacity size corresponding to a size of said compressed audio program, transferring means for transferring said compressed audio program and said program capacity size to said receiving system;

said receiving system comprising:

receiving means for receiving said compressed audio program and said program capacity size;

generating means for generating management information in accordance with said program capacity size; and recording means for recording said compressed audio program and said management information in a recordable area and in said management area of a recording medium, respectively, whereby said transferred compressed audio program is divided into plural compressed audio programs in accordance with said program capacity size.

13. The transfer/reception system as claimed in claim 12 wherein said transferring means also transfers identification data corresponding to said compressed audio program.

14. The transfer/reception system as claimed in claim 13 wherein identification data is at least one of copy protection information, copy generation information, audio channel data and emphasis data.

15. The transfer/reception system as claimed in claim 13 wherein said transferring means also transfers a program name corresponding to said compressed audio program.

16. The transfer/reception system as claimed in claim 13 wherein said transferring means also transfers a number of characters representing a program name.

17. The transfer/reception system as claimed in claim 13 wherein said transferring means also transfers a number of characters representing a program name, and said recording means records said program name in said management area of said recording medium.

18. The transfer/reception system as claimed in claim 12 wherein said receiving means also receives identification data corresponding to said compressed audio program and said recording means records said identification data in said management area of said recording medium.

19. The transfer/reception system as claimed in claim 18 wherein the identification data is at least one of copy protection information, copy generation information, audio channel data and emphasis data.

20. The transfer/reception system as claimed in claim 18 wherein said receiving means also receives a program name corresponding to said compressed audio program said recording means records said program name in said management area of said recording medium.

21. A transferring/receiving method for transferring at least one compressed audio program and receiving a transferred compressed audio program, comprising the steps of:

generating a program capacity size corresponding to the size of said compressed audio program;

transferring said compressed audio program and said program capacity size;

receiving said transferred compressed audio program and said program capacity size;

generating management information in accordance with said program capacity size; and recording said compressed audio program and said management information in a recordable area and in a management area of said recording medium, respectively, whereby a transferred audio program is divided into a plurality of compressed audio programs in accordance with said program capacity size.

* * * * *